UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

PROCESS FOR VULCANIZATION OF RUBBER

No Drawing.     Application filed May 28, 1931. Serial No. 540,629.

The present invention relates to the vulcanization of rubber by a new and improved process wherein a new type of rubber vulcanization accelerator is employed. The manufacture and means of employing the preferred new class of rubber vulcanization accelerators are fully set forth hereinafter and will be readily understood from the following description and examples of a preferred mode of carrying out the invention.

The preferred new class of accelerators comprise a mercaptoarylthiazole derivative of a reaction product of an organic base and an organic acid chloride.

The following is one example of a preferred method of manufacturing one of the new class of accelerating compounds, comprising for example, the mercaptobenzothiazole derivative of the phthalyl chloride reaction product of the material formed by reacting substantially three molecular proportions of acetaldehyde and substantially two molecular proportions of aniline.

Substantially two molecular proportions of the product formed from the reaction of substantially three molecular proportions of acetaldehyde and substantially two molecular proportions of aniline, according to the method set forth in U. S. Patent No. 1,659,152 granted to Clayton Olin North, were dissolved or suspended in a suitable liquid, for example, ethyl alcohol or carbon tetrachloride, and substantially one molecular proportion of phthalyl chloride was then added slowly while agitating and maintaining the temperature at approximately 10 to 30° C. Agitation was preferably continued for a period of approximately one hour after the reactants were mixed. The hydrochloric acid produced in the reaction was removed from the resulting product preferably by digesting with a suitable alkaline material, as for example a 5 to 10% solution of ammonia, sodium hydroxide or sodium carbonate, in the presence of a suitable solvent. The product was finally washed with water to remove the chlorides formed. This reaction product was then further reacted with substantially one molecular proportion of mercaptobenzothiazole by heating the materials together at approximately 140 to 155° C. for a period of time necessary to produce a reaction therebetween, in this case approximately for 30 to 60 minutes. The resulting final product was a resin, melting at substantially 110–118° C.

A portion of the material prepared as described above was incorporated in the usual manner in a so-called pure gum rubber stock comprising 100 parts of pale crepe rubber,
  5 parts of zinc oxide,
  3 parts of sulfur,
  1 part of stearic acid,
  1 part of the mercaptobenzothiazole derivative of the phthalyl chloride reaction product of the material formed by reacting substantially three molecular proportions of acetaldehyde and substantially two molecular proportions of aniline.

The rubber stock thus compounded was then cured in the usual manner by heating in a press for different periods of time at the temperature given by 30 pounds of steam pressure per square inch. The vulcanized rubber product on testing was found to possess the following tensile and modulus characteristics:

Table I

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 323 | 918 | 3650 | 4231 | 740 |
| 45 | 30 | 368 | 1075 | 4255 | 4480 | 730 |
| 60 | 30 | 360 | 1050 | 4250 | 4475 | 730 |

The above data show that the product described above possesses desirable accelerating characteristics when employed in the vulcanization process in the manner described and produces a rubber product of high modulus and tensile characteristics.

The same accelerator described in the foregoing example has also been tested in a rubber tread stock. Thus, the following rubber mix was compounded:
100 parts of smoked sheet rubber,
40 parts of carbon black,
10 parts of zinc oxide,
2 parts of a blended mineral oil and rosin,
3 parts of sulfur,
1 part of stearic acid,
1 part of the mercaptobenzothiazole derivative of the phthalyl chloride reaction product of the material formed by reacting substantially three molecular proportions of acetaldehyde and substantially two molecular proportions of aniline.

The stock thus formed was cured in the usual manner and the product after curing was tested to determine its modulus and tensile properties. The results follow:

Table II

| Cure | | Modulus of elasticity in lbs./in.² at elongations of— | | Tensile at break, in lbs./in.² | Ultimate elongation, % |
|---|---|---|---|---|---|
| Time, mins. | Steam pressure, lbs. | 300% | 500% | | |
| 30 | 30 | 879 | 2235 | 2955 | 610 |
| 45 | 30 | 1120 | 2680 | 3290 | 580 |
| 60 | 30 | 1238 | 2860 | 3560 | 580 |
| 90 | 30 | 1335 | 3030 | 3620 | 570 |

These figures show that the accelerator above described also shows desirable properties when employed in a "tread" stock.

This accelerator has also been tested in a so-called "Black Tube" stock of the following composition:
100 parts of smoked sheet rubber,
40 parts of carbon black,
5 parts of zinc oxide,
2 parts of sulfur,
1 part of stearic acid,
1 part of anti-oxidant,
3 parts of the mercaptobenzothiazole derivative of the phthalyl chloride reaction product of the material formed by reacting substantially three molecular proportions of acetaldehyde and substantially two molecular proportions of aniline.

The stock was cured and tested in the usual manner. The modulus and tensile data for the cured rubber stock follow in Table III.

Table III

| Cure | | Modulus of elasticity in lbs./in.² at elongations of— | | Tensile at break, in lbs./in.² | Ultimate elongation, % |
|---|---|---|---|---|---|
| Time, mins. | Steam pressure, lbs. | 300% | 500% | | |
| 15 | 40 | 866 | 2635 | 4360 | 660 |
| 20 | 40 | 852 | 2530 | 4425 | 650 |
| 25 | 40 | 790 | 2515 | 4310 | 645 |
| 30 | 40 | 847 | 2540 | 4320 | 640 |
| 40 | 40 | 848 | 2330 | 4240 | 640 |

The above data show that the compound employed also shows marked accelerating characteristics when used in a "Black Tube" rubber stock, and does not substantially over cure on continued heating in the press.

Another example of the preferred class of compounds, comprising the mercaptobenzothiazole derivative of the benzoyl chloride reaction product of the material formed by reacting substantially three molecular proportions of acetaldehyde and substantially two molecular proportions of aniline, was prepared by reacting substantially one molecular proportion of the acetaldehyde-aniline reaction product hereinbefore described with substantially one molecular proportion of benzoyl chloride and further reacting the product thus formed with substantially one molecular proportion of mercaptobenzothiazole, and a manner analogous to that described above for the phthalyl chloride product.

A portion of the accelerator just described was compounded in the usual manner in a rubber stock comprising
100 parts of pale crepe rubber,
5 parts of zinc oxide,
3 parts of sulfur,
1 part of stearic acid,
1 part of the mercaptobenzothiazole derivative of the benzoyl chloride reaction product of the material formed by reacting substantially three molecular proportions of acetaldehyde and substantially two molecular proportions of aniline.

The rubber mix, after vulcanization by heating in a press, for different periods of time, exhibited the modulus and tensile characteristics indicated in Table IV.

Table IV

| Cure | | Modulus of elasticity in lbs./in.² at elongations of— | | | Tensile in lbs./in.² at break | Ultimate elongation, % |
|---|---|---|---|---|---|---|
| Time, mins. | Steam pressure, lbs. | 300% | 500% | 700% | | |
| 30 | 30 | 279 | 708 | 2865 | 3720 | 770 |
| 45 | 30 | 302 | 827 | 3340 | 4240 | 750 |
| 60 | 30 | 326 | 856 | 3385 | 4025 | 750 |

The data set forth in Table IV show that the accelerator employed is particularly valuable in effecting the cure of a rubber product.

Another of the preferred class of accelerators, for example, the mercaptobenzothiazole derivative of the phthalyl chloride reaction product of the formaldehyde derivative of the product formed by reacting substantially three molecular proportions of acetaldehyde and substantially two molecular proportions of aniline, was prepared by reacting substantially two molecular proportions of the formaldehyde derivative of the reaction product of substantially three molecular proportions of acetaldehyde and substantially two molecular proportions of aniline, prepared according to the method set forth for said formaldehyde derivative as given in U. S. Patent No. 1,659,151 granted to Clayton Olin North, with substantially one molecular proportion of phthalyl chloride and further reacting the material thus formed with substantially one molecular proportion of mercaptobenzothiazole, in the following manner: The aldehyde-amine and the phthalyl chloride were slowly mixed in the presence of a suitable liquid medium, as for example ethyl alcohol, while agitating constantly and maintaining a temperature of approximately 30° C. The mixture was then heated at a refluxing temperature for a period of approximately thirty minutes. The liquid medium employed, for example, ethyl alcohol, was then removed by a suitable means, as for example by distillation. The residual product was then preferably extracted with hot water to remove the hydrochloric acid formed. The product thus formed was then mixed with the mercaptobenzothiazole and heated with agitation at a temperature of approximately 160–170° C. for a period of approximately one hour. The process described yielded a brittle resin, melting at substantially 145–150° C.

A portion of the accelerator just described was compounded in the usual manner in a rubber stock comprising 100 parts of pale crepe rubber,
5 parts of zinc oxide,
3 parts of sulfur,
1 part of stearic acid,
1 part of the mercaptobenzothiazole derivative of the phthalyl chloride reaction product of the formaldehyde derivative of the material formed by reacting substantially three molecular proportions of acetaldehyde and substantially two molecular proportions of aniline.

After vulcanizing the rubber stock thus compounded, the cured rubber product was found to possess the tensile and modulus characteristics set forth in Table V.

Table V

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 59 | 176 | 694 | 2220 | 910 |
| 45 | 30 | 127 | 304 | 1143 | 2840 | 880 |
| 60 | 30 | 120 | 324 | 1343 | 2995 | 840 |

These data show that the accelerator employed in the above example also possesses accelerating properties when employed in a rubber mix.

Another of the preferred class of compounds, for example, the mercaptobenzothiazole derivative of the phthalyl chloride reaction product of the material formed by reacting substantially three molecular proportions of butyraldehyde and substantially one molecular proportion of aniline, was prepared as follows: Substantially one molecular proportion of phthalyl chloride was added slowly to substantially one molecular proportion of the aldehydeamine while agitating the latter. The temperature rose during the process to approximately 70° C. and the agitation was preferably continued until the reaction was complete, as indicated by a drop in temperature. Substantially one molecular proportion of mercaptobenzothiazole was then added and the temperature maintained at approximately 100–110° C. for approximately two hours while agitating constantly. The hydrochloric acid produced was preferably removed from the product by any convenient means, as for example by washing with water. The product was a dark red resin, melting at substantially 65–70° C. The product thus obtained was likewise incorporated in the usual manner in a rubber stock comprising 100 parts of pale crepe rubber,
5 parts of zinc oxide,
3 parts of sulfur,
1 part of stearic acid
1 part of the mercaptobenzothiazole derivative of the phthalyl chloride reaction product of the material formed by reacting substantially three molecular proportions of butyraldehyde and substantially one molecular proportion of aniline.

This rubber stock was cured in the usual manner and tested to determine its tensile and modulus properties. The results obtained are given in Table VI.

Table VI

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 408 | 1,355 | 4,820 | 5,305 | 740 |
| 45 | 30 | 458 | 1,580 | | 4,795 | 680 |
| 60 | 30 | 458 | 1,648 | | 4,505 | 660 |

The data set forth show that the accelerator employed above also possesses desirable accelerating properties and in fact approaches the activity of an ultra accelerator in action.

Another accelerator of the preferred class, for example, the mercaptobenzothiazole derivative of the benzoyl chloride reaction product of methylene-dipiperidine was prepared as follows: Substantially one molecular proportion of methylene-dipiperidine was dissolved in a suitable inert solvent, for example, acetone or carbon tetrachloride, and substantially one molecular proportion of benzoyl chloride was then slowly added while maintaining the temperature of the solution at approximately 20 to 30° C. Substantially one molecular proportion of mercaptobenzothiazole was then added and the solvent employed removed by any convenient means, as for example, by distillation. The mixture was then heated slowly to approximately 140° C. to remove the hydrochloric acid formed, and then maintained at approximately 140 to 150° C. for approximately one hour. The product, when cool, was a soft resin. In order to test its value as an accelerator, a rubber stock was compounded comprising 100 parts of pale crepe rubber,
5 parts of zinc oxide,
3 parts of sulfur,
1 part of stearic acid
1 part of the mercaptobenzothiazole derivative of the benzoyl chloride reaction product of methylene-dipiperidine.

After vulcanizing the above rubber stock in the usual manner, a cured rubber product having the following physical properties was obtained:

Table VII

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 255 | 570 | 2,500 | 3,920 | 780 |
| 45 | 30 | 291 | 785 | 3,275 | 4,350 | 780 |
| 60 | 30 | 320 | 833 | 3,555 | 4,210 | 740 |

The above figures show that the accelerator used in this case also possesses desirable characteristics.

Another example of the preferred class of compounds, comprising the mercaptobenzothiazole derivative of the acetyl chloride reaction product of methylene-dipiperidine, was prepared by reacting substantially one molecular proportion of methylene-dipiperidine with substantially one molecular proportion of acetyl chloride and further reacting the product thus formed with substantially one molecular proportion of mercaptobenzothiazole, in a manner analogous to that described above for the preparation of the mercaptobenzothiazole derivative of the benzoyl chloride reaction product of methylene-dipiperidine. The product formed was a light brown resin. A portion of this product was compounded in a rubber stock comprising 100 parts of pale crepe rubber,
5 parts of zinc oxide,
3 parts of sulfur,
1 part of stearic acid,
1 part of the mercaptobenzothiazole derivative of the acetyl chloride reaction product of methylene-dipiperidine.

The stock was cured in the usual manner and found upon testing to possess the characteristics set forth in Table VIII.

Table VIII

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 315 | 832 | 3545 | 4550 | 760 |
| 45 | 30 | 355 | 985 | 4000 | 4660 | 760 |
| 60 | 30 | 340 | 981 | 4145 | 4750 | 760 |

These data show that the compound just described also possesses valuable accelerating properties.

Another example of the preferred class of accelerators, comprising the mercaptobenzothiazole derivative of the phthalyl chloride reaction product of piperidine, was prepared as follows: Substantially one molecular proportion of phthalyl chloride was slowly added to substantially one molecular proportion of piperidine in the presence of a suitable solvent, for example, benzol, while agitating. Agitation was then preferably continued for an additional period of approximately two hours. The piperidine hydrochloride formed was filtered off and the filtrate was added slowly to substantially one molecular proportion of the sodium salt of mercaptobenzothiazole in the presence of a suitable solvent or mixture of solvents, as for example benzol and ethyl alcohol, while agitating. Agitation was then preferably continued for an additional period of approximately one-half to one hour. The sodium chloride formed was filtered off and the solvent used was removed by a suitable means for example, by evaporation on a steam bath. The resulting product was a reddish, viscous resin. A portion of this product was incorporated in a rubber stock of the following composition:

100 parts of pale crepe rubber,
5 parts of zinc oxide,
3 parts of sulfur,
1 part of stearic acid,
1 part of the mercaptobenzothiazole derivative of the phthalyl chloride reaction product of piperidine.

This stock was cured and the vulcanized product submitted to physical tests. The results follow in Table IX.

Table IX

| Cure | | Modulus of elasticity in lbs./in.² at elongations of— | | | Tensile at break, in lbs./in.² | Ultimate elongation, % |
|---|---|---|---|---|---|---|
| Time, mins. | Steam pressure, lbs. | 300% | 500% | 700% | | |
| 30 | 30 | 141 | 306 | 1070 | 2780 | 880 |
| 45 | 30 | 166 | 382 | 1388 | 3320 | 860 |
| 60 | 30 | 187 | 423 | 1583 | 3675 | 865 |

From the data hereinbefore set forth it is conclusively shown that the new class of materials comprise a group of particularly valuable vulcanization accelerators.

In like manner, other organic bases and derivatives thereof than those described above may be reacted with various acid chlorides, and the products formed thereby may be further reacted with mercaptoarylthiazoles to form further examples of the preferred class of materials. Thus, butylidene dianilide, heptylidene dianilide, ethylidene di-ortho-toluidide, butylidene di-ortho-toluidide, and the like, may be reacted with acetyl chloride, heptoyl chloride, succinyl chloride, benzoyl chloride, phthalyl chloride, and the like, and the products so formed may be reacted with mercaptobenzothiazole, mercaptotolylthiazole, mercaptonaphthothiazole, and the like, and the resulting compounds employed as rubber vulcanization accelerators.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising a mercaptoarylthiazole derivative of a reaction product of an organic base and an organic acid halide.

2. The process of vulcanizing rubber which comprises heating rubber and sulfur in the presence of an accelerator comprising a mercaptobenzothiazole derivative of a reaction product of an organic base and an organic acid chloride.

3. The process of vulcanizing rubber which comprises heating rubber and sulfur in the presence of an accelerator comprising a mercaptobenzothiazole derivative of a reaction product of an aldehyde-amine product and an organic acid chloride.

4. The process of vulcanizing rubber which comprises heating rubber and sulfur in the presence of an accelerator comprising a mercaptobenzothiazole derivative of a reaction product of an aliphatic aldehyde-aromatic amine product and an organic acid chloride.

5. The process of vulcanizing rubber which comprises heating rubber and sulfur in the presence of an accelerator comprising a mercaptobenzothiazole derivative of a reaction product of an aldehyde derivative of a Schiff's base and an organic acid chloride.

6. The process of vulcanizing rubber which comprises heating rubber and sulfur in the presence of an accelerator comprising a mercaptobenzothiazole derivative of a reaction product of an aldehyde derivative of a Schiff's base and an aromatic acid chloride.

7. The process of vulcanizing rubber which comprises heating rubber and sulfur in the presence of an accelerator comprising a mercaptobenzothiazole derivative of a reaction product of an aldehyde derivative of a Schiff's base and phthalyl chloride.

8. The process of vulcanizing rubber which comprises heating rubber and sulfur in the presence of an accelerator comprising a mercaptobenzothiazole derivative of a phthalyl chloride reaction product of the material formed by reacting substantially three molecular proportions of acetaldehyde and substantially two molecular proportions of aniline.

9. The process of vulcanizing rubber which comprises heating rubber and sulfur in the presence of an accelerator comprising a material formed by reacting substantially one molecular proportion of phthalyl chloride with substantially two molecular proportions of the reaction product of substantially three molecular proportions of acetaldehyde and substantially two molecular proportions of aniline and further reacting the product thus formed with substantially one molecular proportion of mercaptobenzothiazole.

10. The vulcanized rubber produced by heating rubber and sulfur in the presence of an accelerator comprising a mercaptoarylthiazole derivative of a reaction product of an organic base and an organic acid halide.

11. The vulcanized rubber produced by heating rubber and sulfur in the presence of an accelerator comprising a mercaptobenzothiazole derivative of a reaction product of an organic base and an organic acid chloride.

12. The vulcanized rubber produced by heating rubber and sulfur in the presence of an accelerator comprising a mercaptobenzothiazole derivative of a reaction product of an aldehydeamine product and an organic acid chloride.

13. The vulcanized rubber produced by heating rubber and sulfur in the presence of an accelerator comprising a mercaptobenzothiazole derivative of a reaction product of an aliphatic aldehyde-aromatic amine product and an organic acid chloride.

14. The vulcanized rubber produced by heating rubber and sulfur in the presence of an accelerator comprising a mercaptobenzothiazole derivative of a reaction product of an aldehyde derivative of a Schiff's base and an organic acid chloride.

15. The vulcanized rubber produced by heating rubber and sulfur in the presence of an accelerator comprising a mercaptobenzothiazole derivative of a reaction product of an aldehyde derivative of a Schiff's base and an aromatic acid chloride.

16. The vulcanized rubber produced by heating rubber and sulfur in the presence of an accelerator comprising a mercaptobenzothiazole derivative of a reaction product of an aldehyde derivative of a Schiff's base and phthalyl chloride.

17. The vulcanized rubber produced by heating rubber and sulfur in the presence of an accelerator comprising a mercaptobenzothiazole derivative of a phthalyl chloride reaction product of the material formed by reacting substantially three molecular proportions of acetaldehyde and substantially two molecular proportions of aniline.

18. The vulcanized rubber produced by heating rubber and sulfur in the presence of an accelerator comprising a material formed by reacting substantially one molecular proportion of phthalyl chloride with substantially two molecular proportions of the reaction product of substantially three molecular proportions of acetaldehyde and substantially two molecular proportions of aniline and further reacting the product thus formed with substantially one molecular proportion of mercaptobenzothiazole.

19. The process of vulcanizing rubber which comprises heating rubber and sulfur in the presence of an accelerator comprising a mercaptoarylthiazole derivative of a reaction product of an aldehyde-amine product and an organic acid chloride.

20. The process of vulcanizing rubber which comprises heating rubber and sulfur in the presence of an accelerator comprising a mercaptoarylthiazole derivative of a reaction product of an aldehyde derivative of a Schiff's base and an organic acid chloride.

21. The vulcanized rubber produced by heating rubber and sulfur in the presence of an accelerator comprising a mercaptoarylthiazole derivative of a reaction product of an aldehyde-amine product and an organic acid chloride.

22. The vulcanized rubber produced by heating rubber and sulfur in the presence of an accelerator comprising a mercaptoarylthiazole derivative of a reaction product of an aldehyde derivative of a Schiff's base and an organic acid chloride.

In testimony whereof I hereunto affix my signature.

ROBERT L. SIBLEY.